United States Patent
Razzacki et al.

(10) Patent No.: US 7,565,845 B2
(45) Date of Patent: Jul. 28, 2009

(54) INDEX TORQUE MEASUREMENT SYSTEM AND METHOD

(75) Inventors: Syed T. Razzacki, Troy, MI (US); Denis C. Wieczorek, Lake Orion, MI (US); Jonathan E. Hottenstein, Royal Oak, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/873,027

(22) Filed: Oct. 16, 2007

(65) Prior Publication Data

US 2009/0095089 A1    Apr. 16, 2009

(51) Int. Cl.
*G01D 1/00* (2006.01)
(52) U.S. Cl. .................................................. 73/862.53
(58) Field of Classification Search ............. 73/862.53, 73/121–132
See application file for complete search history.

(56) References Cited

U.S. PATENT DOCUMENTS 3,595,073 A * 7/1971 Morris .................... 73/862.17
4,335,619 A * 6/1982 Wetzel .................... 73/862.17
4,856,325 A * 8/1989 Tomita et al. ............. 73/150 A
5,167,148 A * 12/1992 Black et al. .................. 73/121

FOREIGN PATENT DOCUMENTS

JP            09054003 A  *  2/1997

* cited by examiner

*Primary Examiner*—Max Noori
(74) *Attorney, Agent, or Firm*—Ralph E. Smith

(57) ABSTRACT

An index torque measurement system is provided. The system includes a blocker ring and a source, of index torque. The source of index torque applies a varying amount of index torque to the blocker ring to allow smooth indexing of the blocker ring teeth with synchronizer sleeve teeth. The system includes a synchronizer sleeve drivable to overcome the index torque to engage the blocker ring. The system further includes a measurement system that measures the force to overcome the index torque based on a load required to drive the synchronizer sleeve into engagement with the blocker ring given the applied index torque.

16 Claims, 3 Drawing Sheets

INDEX TORQUE MEASUREMENT SYSTEM AND METHOD

FIELD

The present disclosure relates to transmissions systems, and more particularly to an index torque measurement system for a synchronizer of a dual clutch transmission.

BACKGROUND

The transmission is a major component that transmits engine power and speed to the wheels upon driver's demand. Thus, the operating efficiency of the transmission or its ability to transmit maximum power with minimum losses is recognized as an essential item of transmission design and development. In an automatic transmission, for example, the efficiency of the transmission is about 85% to about 87%, which proportionately affects fuel efficiency. In a manual transmission, for example, the efficiency of the transmission is about 96% or better efficiency, which results in relatively improved fuel economy. Thus, manufacturers are looking to design an automatic transmission with an improved efficiency.

The new technology combines best of both the systems for added efficiency and enhanced fuel economy as well as automatic shifting. Manual transmission architecture with synchronizers may be used for maximum efficiency, and launch clutches, wet or dry, may be used with electronics along with mechanical or hydraulic actuation systems to effect automatic shifting.

The design of synchronizers is largely dependent upon clutch drag and transmission system efficiency: the lower the drag, the higher the efficiency, the higher the fuel economy, and the smoother the gear transition. Therefore, it may be desirable to measure the index torque of the synchronizer as designed for comparison with the drag torque to ensure that the index torque is greater than drag torque for smooth shiftability.

SUMMARY

An index torque measurement system includes a blocker ring and a source of index torque. The source of index torque applies a varying amount of index torque to the blocker ring to allow smooth indexing of the blocker ring teeth with synchronizer sleeve teeth. The system includes a synchronizer sleeve drivable to overcome the index torque to engage the blocker ring. The system further includes a measurement system that measures the force to overcome the index torque based on a load required to drive the synchronizer sleeve into engagement with the blocker ring given the applied index torque.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. Although the following description is related generally to an index torque measurement system for a synchronizer for use with a dual clutch transmission in a motor vehicle, it will be understood that the index torque measurement system as described and claimed herein is applicable to any type of transmission system or gear application in which it may be desirable to determine the index torque. Therefore, it will be understood that the following discussion is not intended to limit the scope of the appended claims to only motor vehicles or dual clutch transmission applications.

Figure 1:
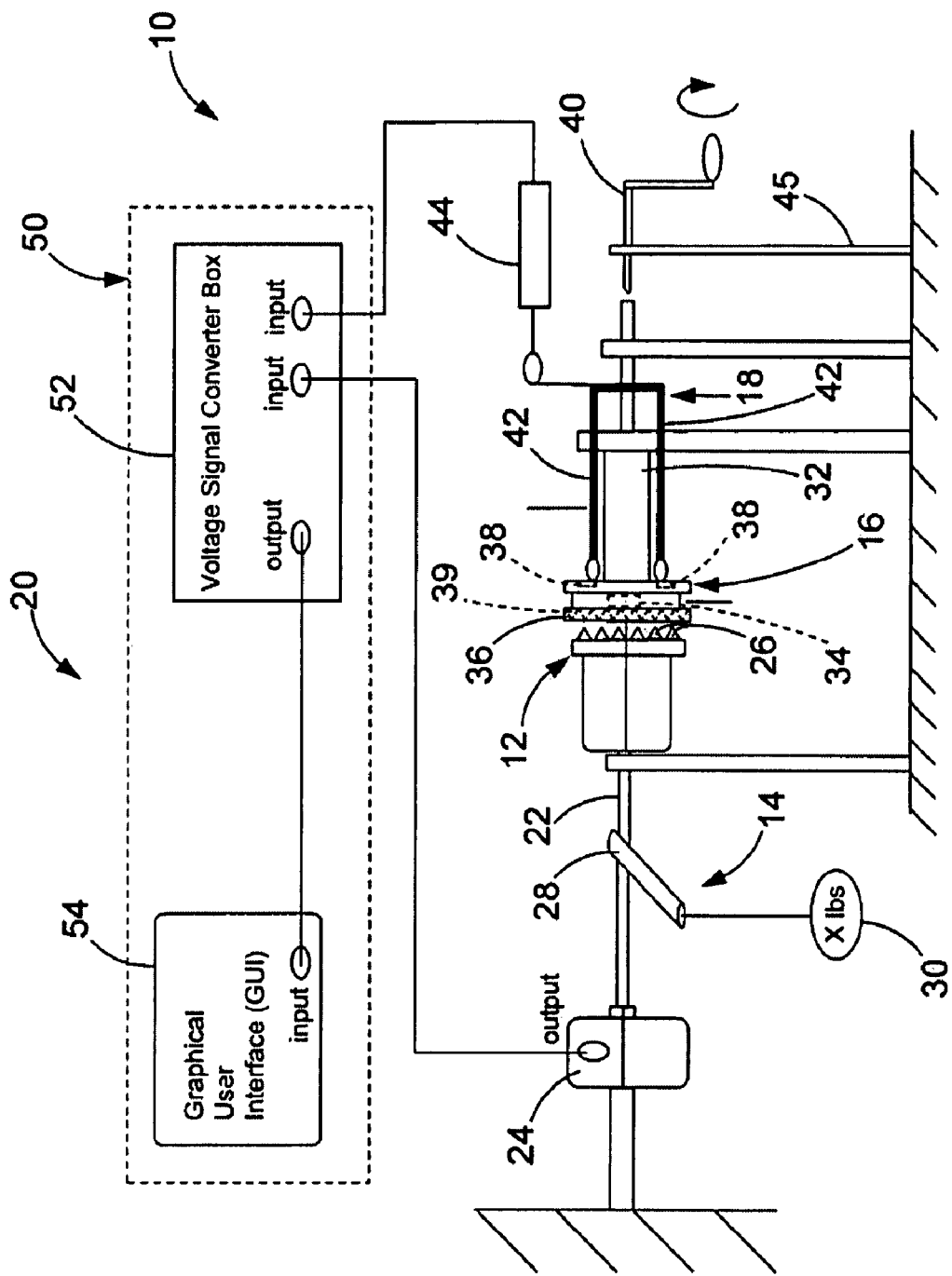
FIG. 1 is a schematic illustration of an index torque measurement system according to the principles of the present disclosure.

With reference to FIG. 1, an index torque measurement system 10 is shown. The index torque measurement system 10 provides data that enables a comparison between a calculated and an actual measured index torque for a given synchronizer. The synchronizer should be designed with an index torque that compensates for the drag torque to successfully engage the synchronizer sleeve in gear. The index torque measurement system 10 enables the analysis of actual index torque changes when a geometry or coefficient of friction change is made to the synchronizer, as the index torque measurement system 10 may be used with a variety of synchronizer geometries. The index torque measurement system 10 includes a blocker ring 12, a source of index torque 14, a synchronizer assembly 16, a crank system 18 and a measurement system 20. The index torque measurement system 10 may be used to determine the index torque associated with the synchronizer assembly 16.

The blocker ring 12 is fixedly mounted to a rotatable shaft 22, which is coupled to a load cell 24. As the blocker ring 12 may comprise any suitable conventional blocker ring, the blocker ring 12 will not be described in great detail herein. Briefly, however, the blocker ring 12 may include a frictional surface or a frictional element with varying numbers of teeth 26. The teeth 26 may be configured to interface with the synchronizer assembly 16, and may be configured such that the blocker ring 12 rotates or indexes upon initial contact between the blocker ring teeth 26 and the synchronizer assembly 16. The rotation of the blocker ring 12 in turn rotates the rotatable shaft 22, and this rotation is measured by the load cell 24. The load cell 24 may comprise any suitable force measurement device, such as a 500 pound load cell, which measures the load applied to the blocker ring 12 in terms of an output voltage. The load cell 24 is in communication with the measurement system 20 to provide the measurement system 20 with the output voltage, and the measurement system 20 converts the received output voltage into pound-force, as will be discussed.

The source of index torque 14 is coupled to the rotatable shaft 22. The source of index torque 14 includes a moment arm 28 and a known weight 30. The moment arm 28 may comprise a beam, with a known length, that is coupled to the rotatable shaft 22. The moment arm 28 may have any desired length, such as between about 0.200 meters to about 0.500 meters, that is capable of simulating an index torque on the rotatable shaft 22, and thus, the blocker ring 12. The weight 30 is coupled to the moment arm 28 at the location desired to create the index torque. Generally, the weight 30 is coupled near an end of the moment arm 28 to induce a larger torque on the rotatable shaft 22. The weight 30 may be coupled to the moment arm 28 through any suitable technique, such as a cable, mechanical fasteners, clamps, etc. Depending upon the length of the moment arm 28 and the weight 30, the index torque may be calculated as:

$$\text{Index Torque} = \text{Length of moment arm} \times \text{Force} \quad (1)$$

Wherein the force is the weight 30.

The synchronizer assembly 16 has a synchronizer hub 34. The synchronizer hub 34 is coupled to a fixed shaft 32. As the synchronizer hub 34 may comprise any suitable conventional synchronizer hub, the synchronizer hub 34 will not be discussed in great detail herein. The synchronizer assembly 16 also includes a synchronizer sleeve 36, and a plurality of strut detents 38. The synchronizer sleeve 36 is slidingly coupled to the synchronizer hub 34, and includes the detents 38, and a plurality of teeth 39 (shown in phantom). Typically, the synchronizer hub 34 includes about three detents 38, evenly spaced about a circumference of the synchronizer sleeve 36. The detents 38 move axially in reaction to an axial load received from the crank system 18, and set the blocker ring 12 for engagement with the synchronizer sleeve 36. The first engagement between the blocker ring 12 and the synchronizer sleeve 36 is generally the engagement or contact between the teeth 39 of the synchronizer sleeve 36 and the teeth 26 of the blocker ring 12.

The crank system 18 applies the axial load to the synchronizer sleeve 36. The crank system 18 includes a crank arm 40 and a plurality of load pins 42. The crank arm 40 is slideably supported, by an arm 45 for example, such that it may be rotated relative to the synchronizer sleeve 36. The crank arm 40 is coupled to the load pins 42 such that the rotation of the crank arm 40 drives the load pins 42 axially relative to the synchronizer sleeve 36. The load pins 42 may be spaced about a circumference substantially equivalent to the circumference of the synchronizer sleeve 36 such that the load pins 42 contact the sleeve axially. By contacting the synchronizer sleeve 36, the load pins 42 may apply the axial load generated by the rotation of the crank arm 40 to the synchronizer sleeve 36. As will be discussed, the axial load from the crank system 18 may overcome the induced index torque to enable the synchronizer sleeve 36 to move linearly to engage the blocker ring 12. The linear displacement of the synchronizer sleeve 36 is measured by a linear variable differential transformer (LVDT) 44. The LVDT 44 measures the linear displacement of the synchronizer sleeve 36 and transmits the linear displacement measurement as an output voltage to the measurement system 20.

Figure 2:
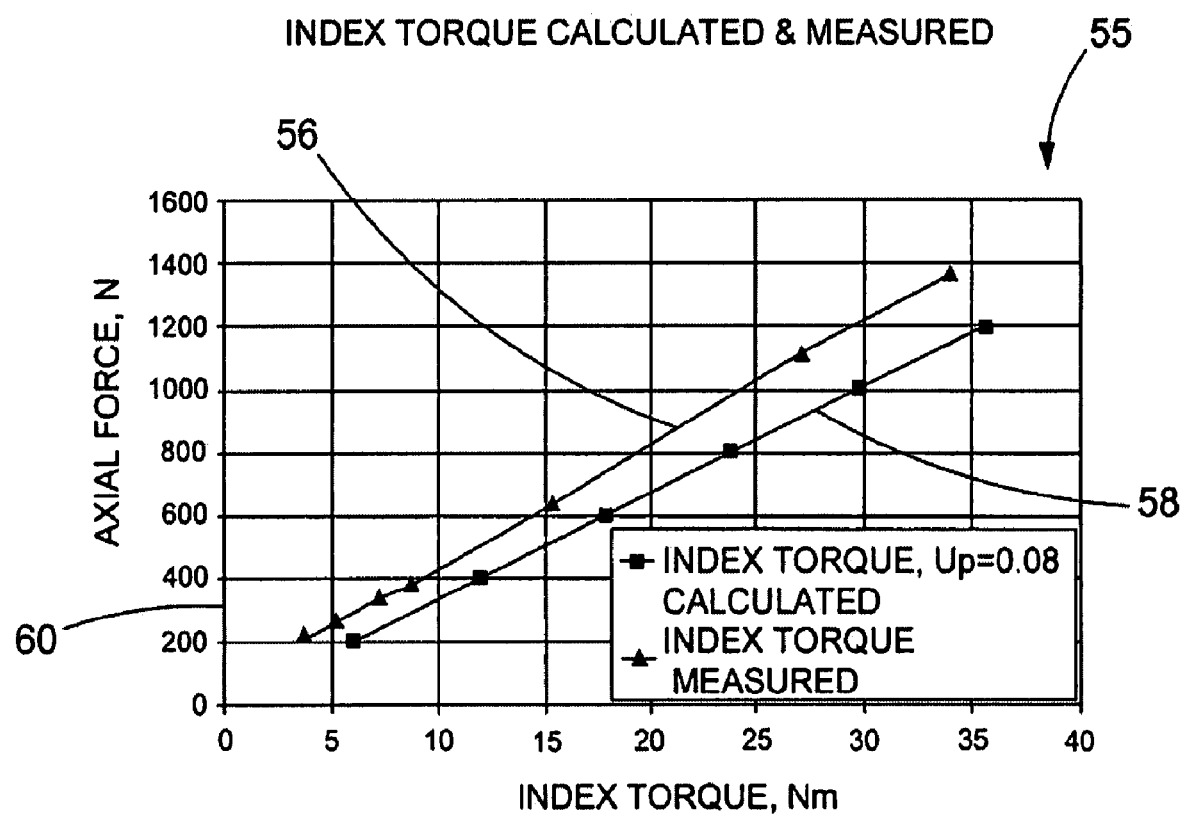
FIG. 2 is a graph representing the output of the index torque measurement system of FIG. 1.

The measurement system 20 receives the linear displacement of the synchronizer sleeve 36 from the LVDT 44, and computes force to overcome the index torque based on the index torque, the linear displacement of the synchronizer sleeve 36 and the axial load measured by the load cell 24. The measurement system 20 includes a controller 50. The controller 50 may include a voltage signal converter box 52 and a graphical user interface (GUI) 54. The voltage signal converter box 52 receives the output voltage from the load cell 24 and the output voltage from the LVDT 44. Given the output voltage from both the load cell 24 and the LVDT 44, the voltage signal converter box 52 converts the output voltage into pound-force and linear displacement, respectively. The voltage signal converter box 52 then outputs these restored values to the GUI 54. Based on the received pound-force, linear displacement and known index torque, as shown in FIG. 2, the GUI 54 populates a graphical representation 55 of a measured index torque 56 and a calculated index torque 58 in Newton-meters (N-m) versus an axial force 60 in Newtons (N). In addition, the raw data collected by the controller 50 may be output in a tabular format and manipulated as desired, not shown.

Figure 3:
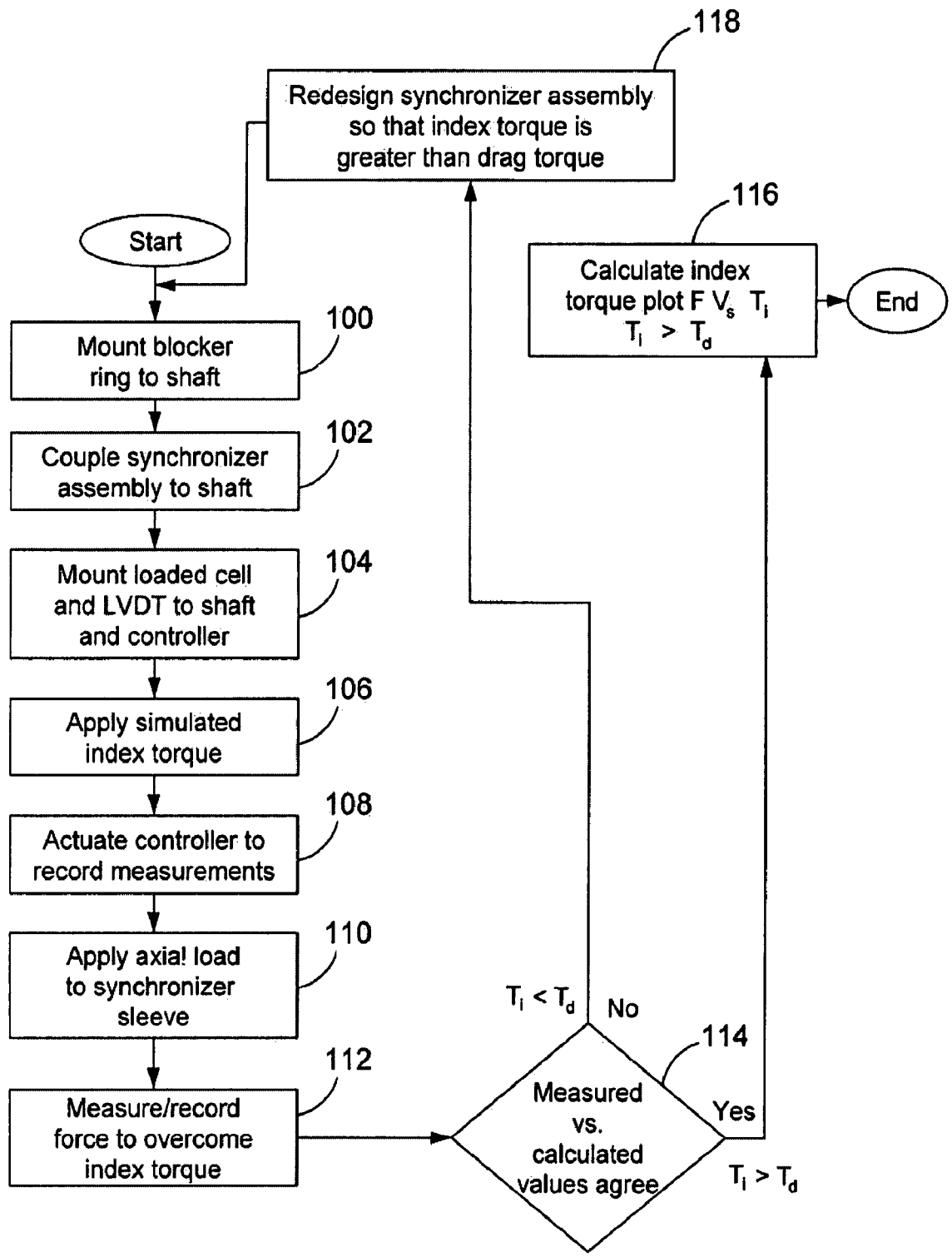
FIG. 3 is a flow chart illustrating a method of measuring the index torque using the index torque measurement system of FIG. 1.

With reference now to FIG. 3, a method of using the index torque measurement system 10 is shown. At block 100, the appropriate blocker ring 12 is mounted to the rotatable shaft 22. At block 102, the synchronizer assembly 16 is coupled to the fixed shaft 32. In this regard, synchronizer assembly 16 is slideably assembled on synchronizer hub 34, which is coupled to the fixed shaft 32. At block 104, the load cell 24 is coupled to the rotatable shaft 22 and the controller 50, while the LVDT 44 is coupled to the fixed shaft 32 and the controller 50. At block 106, the moment arm 28 is coupled to the rotatable shaft 22, and the weight 30 is coupled to the moment arm 28 to simulate an index torque on the blocker ring 12. The index torque created by the source of index torque 14 is the torque that must be overcome to enable the synchronizer sleeve 36 to engage the blocker ring 12.

At block 108, the controller 50 may be activated to begin the collection of the output voltage generated by the load cell 24 and LVDT 44. At block 110, the crank arm 40 is rotated to apply a consistent axial load to the synchronizer sleeve 36 via the contact between the load pins 42 and the synchronizer sleeve 36. As the crank arm 40 is rotated, the teeth 39 of the synchronizer sleeve 36 will contact and engage the teeth 26 of the blocker ring 12. At block 112, the controller 50 measures or records the force required to overcome the index torque. At decision block 114, the method determines if the measured and calculated index torque values agree by determining if the axial load applied by the crank system 18 is great enough to overcome the index torque and index the blocker ring 12 so that the synchronizer sleeve 36 may pass through the blocker ring 12. If the axial load is great enough to overcome the index torque, then the method goes to block 116. If the axial load is not great enough to overcome the index torque, the method goes to block 118. At block 116, the data collection by the controller 50 is stopped and the measured index torque is output to the GUI 54. The data may be output to the GUI 54 in any format, such as a graphical or tabular format, as discussed. At block 118, the synchronizer assembly 16 is redesigned so that the index torque is greater than the drag torque on the synchronizer assembly 16. Then, the method is repeated to measure the index torque for the redesigned synchronizer assembly 16.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this disclosure, but that the scope of the present disclosure will include any embodiments falling within the foregoing description and the appended claims.

What is claimed is:

1. An index torque measurement system comprising:
   a blocker ring;
   a source of index torque that applies an index torque to the blocker ring to allow the movement of the blocker ring, the source of index torque including a moment arm coupled to a rotatable shaft and a known weight coupled to the moment arm to generate the index torque;
   a synchronizer assembly drivable to overcome the index torque to engage the blocker ring; and
   a measurement system that measures a force to overcome the index torque based on a load required to drive the synchronizer assembly into engagement with the blocker ring given the applied index torque.

2. The system of claim 1 wherein the rotatable shaft is spaced apart from the synchronizer and the synchronizer is coupled to a fixed shaft, and the source of index torque is coupled to the rotatable shaft.

3. The system of claim 2, further comprising a crank system that is operable to apply an axial load to the synchronizer assembly to drive the synchronizer assembly into engagement with the blocker ring.

4. The system of claim 3, further comprising a load cell coupled to the rotatable shaft to measure the axial load applied by the crank system and to transmit the axial load measurement to the measurement system.

5. The system of claim 4, wherein the synchronizer assembly further comprises a synchronizer hub fixedly mounted on the fixed shaft and a synchronizer sleeve slidingly coupled to the synchronizer hub, the synchronizer sleeve including a plurality of detent struts spaced about a circumference of the synchronizer sleeve to receive the axial load from the crank system and set the blocker ring for engagement with synchronizer sleeve.

6. The system of claim 5, wherein the crank system further comprises a crank arm that is rotatable to enable the application of the axial load to the synchronizer sleeve and a plurality of load pins formed about a circumference of the synchronizer sleeve to apply the axial load to the synchronizer sleeve.

7. The system of claim 6, further comprising a linear variable differential transformer that measures the linear displacement of the synchronizer sleeve and transmits the linear displacement measurement to the measurement system.

8. The system of claim 7, wherein the measurement system comprises a controller that determines the force to overcome the index torque as a function of the axial load based on the linear displacement of the synchronizer sleeve.

9. An index torque measurement system comprising:
   a blocker ring coupled to a shaft;
   a source of index torque that applies an index torque to the shaft to restrict the movement of the blocker ring;
   a synchronizer assembly drivable to overcome the index torque to engage the blocker ring;
   a crank system that is operable to apply an axial load to the synchronizer assembly to drive the synchronizer assembly into engagement with the blocker ring, the crank system including a crank arm that is rotatable to enable the application of the axial load to the synchronizer assembly and a plurality of load pins formed about a circumference and coupled to the crank arm such that the rotation of the crank arm moves the plurality of load pins axially to contact the synchronizer assembly to apply the axial load to the synchronizer assembly; and
   a measurement system that measures the index torque based on the axial load required to drive the synchronizer assembly into engagement with the blocker ring given the applied index torque.

10. The system of claim 9, wherein the blocker ring is coupled to a rotatable shaft spaced apart from the synchronizer assembly, the synchronizer assembly is coupled to a fixed shaft, and the source of index torque comprises a moment arm coupled to the rotatable shaft with a known weight coupled to the moment arm to generate the index torque.

11. The system of claim 10, further comprising a load cell coupled to the rotatable shaft to measure the axial load applied by the crank system and to transmit the axial load measurement to the measurement system.

12. The system of claim 11, wherein the synchronizer assembly further comprises a synchronizer hub fixedly mounted on the fixed shaft and a synchronizer sleeve slidingly coupled to the synchronizer hub, the synchronizer sleeve including a plurality of detent struts spaced about a circumference of the synchronizer sleeve to receive the axial load from the plurality of load pins of the crank system.

13. The system of claim 12, further comprising:
    a linear variable differential transformer that measures the linear displacement of the synchronizer sleeve and transmits the linear displacement measurement to the measurement system; and
    wherein the measurement system comprises a controller that determines a force to overcome the index torque as a function of the linear displacement of the synchronizer sleeve.

14. A method of measuring an index torque comprising:
    positioning a blocker ring on a rotatable shaft;
    slidingly mounting a synchronizer sleeve on a synchronizer hub fixedly coupled to a fixed shaft apart from the blocker ring, the synchronizer sleeve moveable to engage the blocker ring;
    coupling a moment arm to the rotatable shaft;
    coupling a weight to the moment arm to simulate an index torque on the blocker ring;
    applying an axial load to the synchronizer sleeve to move the synchronizer sleeve; and
    determining the axial load required to move the synchronizer sleeve until the synchronizer sleeve engages the blocker ring.

15. The method of claim 14, wherein applying the axial load further comprises:
    rotating a crank arm such that a plurality of load pins apply an axial load to the synchronizer sleeve.

16. The method of claim 15, further comprising:
    determining the linear displacement of the synchronizer sleeve in response to the axial load; and
    computing a force to overcome the index torque as a function of the linear displacement of synchronizer sleeve.

* * * * *